United States Patent [19]

Block

[11] Patent Number: 4,798,325
[45] Date of Patent: Jan. 17, 1989

[54] METHOD AND APPARATUS FOR APPLYING LIQUID AND DRY LAWN TREATMENT MATERIALS

[75] Inventor: Robert E. Block, Prarieview, Ill.

[73] Assignees: Robert F. Parmley, Lindenhurst; Marino D. Floreani, Park Ridge, both of Ill.

[21] Appl. No.: 40,298

[22] Filed: Apr. 20, 1987

[51] Int. Cl.$^4$ .................. A01C 15/00; A01C 19/04; B05B 1/20
[52] U.S. Cl. .................. 239/663; 239/156; 239/170; 239/176; 239/289; 239/684
[58] Field of Search ............ 239/663, 662, 650, 684, 239/685, 687, 146, 155, 156, 289, 176, 164

[56] References Cited

U.S. PATENT DOCUMENTS

| | | | |
|---|---|---|---|
| 4,106,703 | 8/1978 | Magda | 239/656 |
| 4,185,782 | 1/1980 | Belrose | 239/663 |
| 4,269,356 | 5/1981 | Rose | 239/176 |
| 4,281,780 | 8/1981 | Lagani, Jr. | 222/610 |
| 4,352,463 | 10/1982 | Baker | 239/663 |
| 4,483,486 | 11/1984 | Magda | 239/663 |
| 4,485,939 | 12/1984 | Gafford | 222/129 |
| 4,602,742 | 7/1986 | Penson | 239/176 |

*Primary Examiner*—Andres Kashnikow
*Assistant Examiner*—Karen B. Merritt
*Attorney, Agent, or Firm*—McCaleb, Lucas & Brugman

[57] ABSTRACT

A self-contained, hand-operated, compact applicator for dispensing liquid and/or dry lawn care products is disclosed in which dry treatment materials are broadcast from a hopper in response to manual propulsion of the applicator over the terrain and liquid materials, stored in a tank carried by the hopper, are pressurized by electrically powered pump means and dispensed via plural valve operated spray nozzles selectively controlled by the operator to effect regulated and uniform application of dry and liquid treatment materials either contemporaneously or independently of one another.

7 Claims, 3 Drawing Sheets

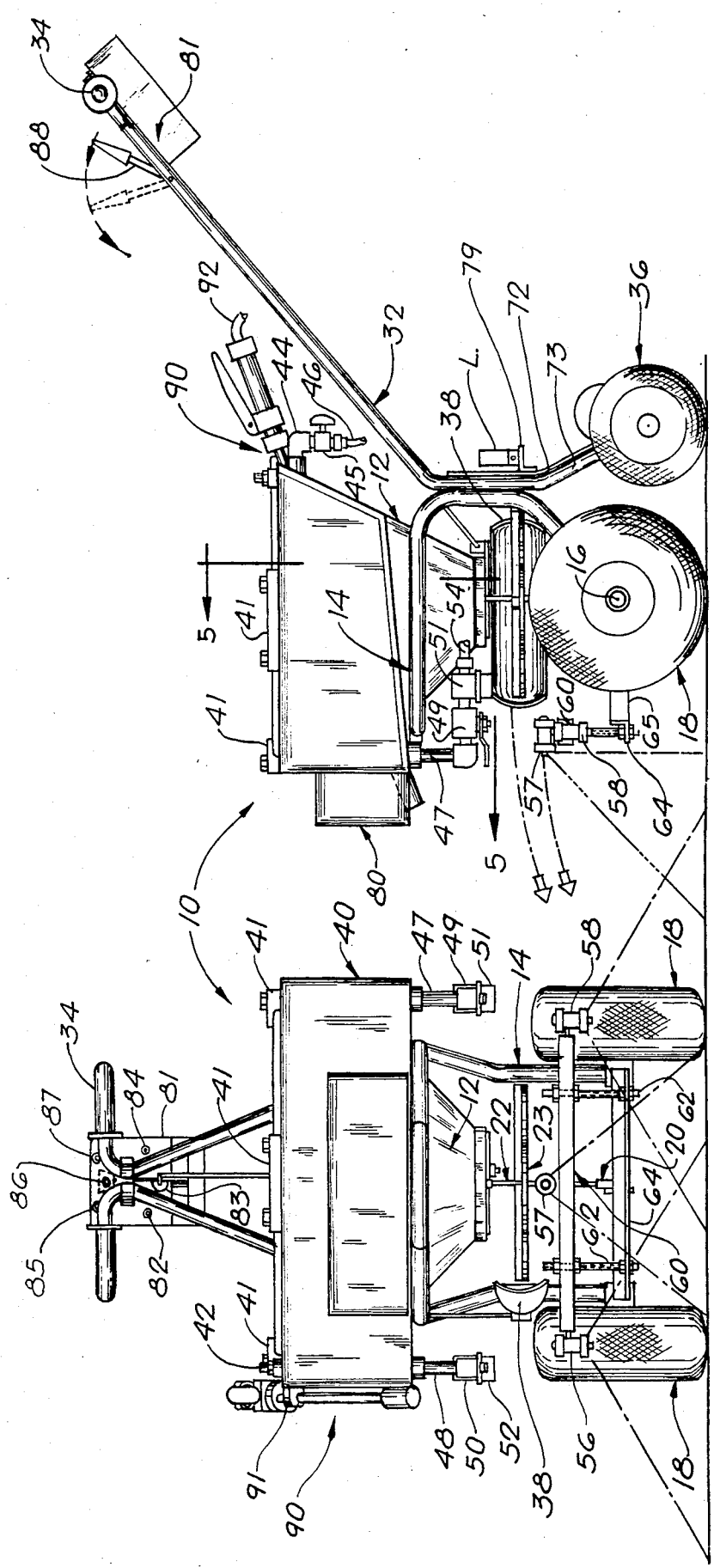

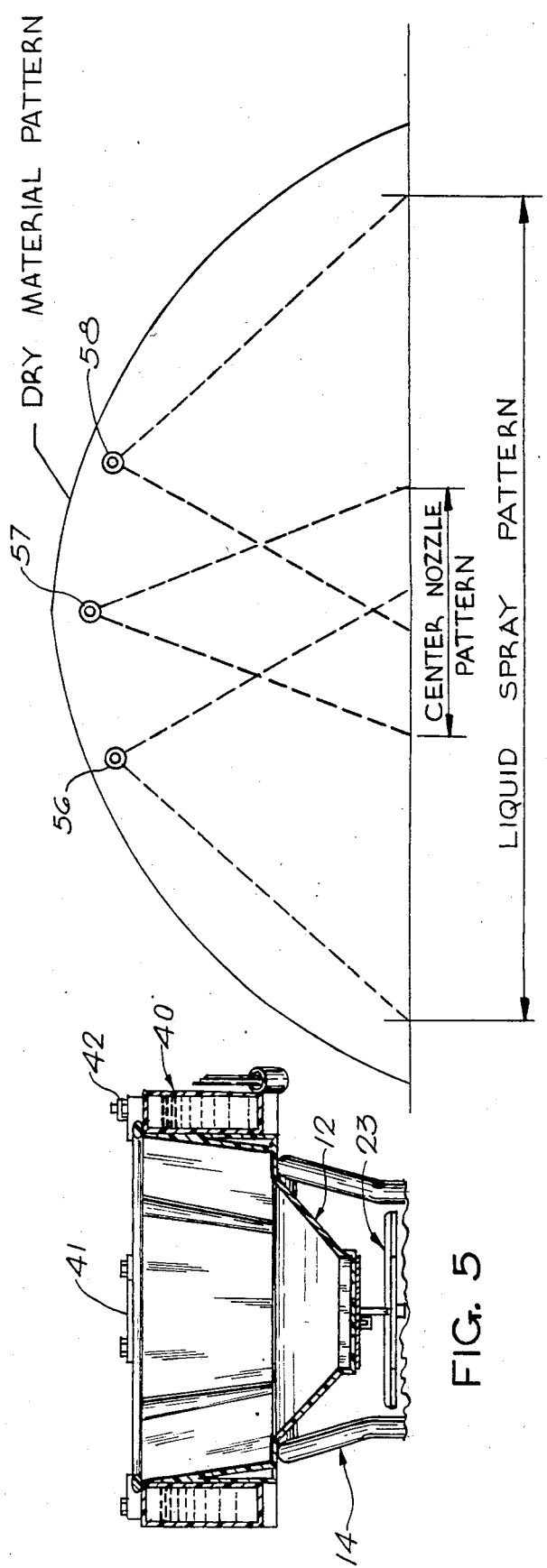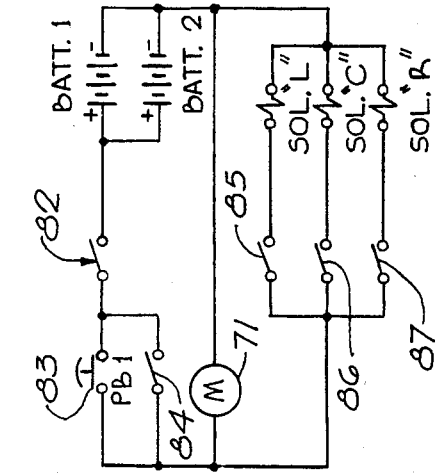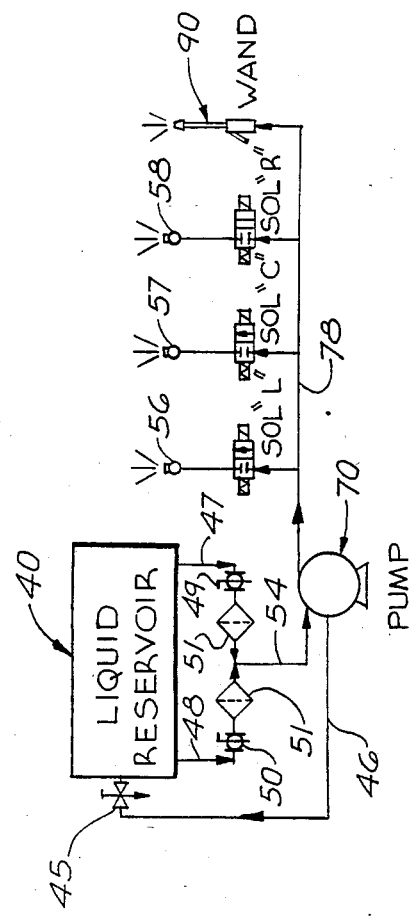

METHOD AND APPARATUS FOR APPLYING LIQUID AND DRY LAWN TREATMENT MATERIALS

This invention relates generally to the art of lawn or turf care and more particularly to improve applicator means and a method for uniformly applying liquid and/or dry treatment materials over turf areas.

BACKGROUND OF THE INVENTION

Proper care and maintenance of a lawn or turf area requires periodic application of fertilizers, herbicides, insecticides, and other chemicals depending on the condition of the lawn to be treated. Since the task of proper lawn maintenance can be time consuming, difficult and tiring, particularly to the individual homeowner, professional lawn care services have become increasingly popular. Traditionally, such services apply fertilizers and herbicides to turf areas, usually at regular intervals of four or five times per growing season. The primary method of application has been to mix the prescribed herbicides with a liquid fertilizer solution in a large truck mounted tank from which the mixture is pumped through a hose to a nozzle or hand spray wand and applied to the lawn. At best this method of application leaves much to be desired. Properly trained operators must master the technique of hand spraying the chemicals uniformly in order to insure even turf growth and color, proper control of weeds, and to avoid chemical damage to the turf or adjacent ornamentals. Such method is highly susceptible to wind conditions since with the liquid leaving the hand gun at waist height or higher even a slight wind can cause the sprayed materials to drift from a targeted area into unwanted places.

Because of the difficulty of the hand spraying application, dry fertilizer products have been resorted to. By using a good quality, properly calibrated spreader it is quite easy to uniformly spread the dry fertilizer products. In order to alleviate the cost and labor of applying liquid herbicides independently of the dry products, combination dry herbicide and granular fertilizer products have been introduced. However, the cost and treatment effectiveness of the dry herbicides has seriously detracted from popularity of such products despite the capability of uniform product distribution and lessening wind effect on the application. As a result the lawn service industry has more recently returned to the original liquid application methods. However, the support equipment for this system, requiring multiple storage tanks, elaborate pumping systems, high volume water supply and increasing costs of liquid application truck equipment has become a heavy cost burden to the lawn service operator, as well as the purchaser of the services.

In recognition of the foregoing indicated problems and drawbacks of traditional equipment and materials presently in use in the lawn service industry, there is a need for a cost efficient application system which can apply both dry fertilizer and liquid weed controls simultaneously or independently at the operator's command while carrying out such functions as the equipment traverses the turf area to be serviced. Such equipment must also be of a size capable of being readily maneuvered around obstacles or through narrow passageways, such as gates or entrance-ways, encountered by the operator during the application procedures.

The present invention is directed to the provision of improved equipment for applying wet and dry lawn treatment materials and to a method of application which alleviates many of the aforenoted problems and application difficulties encountered in lawn or turf maintenance problems.

Combination machines for applying wet and dry treatment materials such as dry fertilizers and liquid herbicides, etc., have been developed heretofore, but have experienced limited success. Typifying such prior developments, for example, is the wet/dry spreader taught in U.S. Pat. No. 4,352,463 issued to Baker on Oct. 5, 1982. In accordance with that patent a power driven combination wet and dry lawn treatment spreader is disclosed wherein dry fertilizer materials are stored in a hopper and fed by gravity to a spinning impeller which distributes or broadcasts the granulated materials in a fan-like pattern. Liquid treatment materials are sprayed in a similar pattern. The wet materials are supplied from a remote tank truck via a hose connected to the spreader. Provision of the remote supply truck tank and pump and the interconnecting hose makes manipulation of the spreader cumbersome and of limited maneuverability inasmuch as the heavy hose must be dragged over the terrain to be treated.

A later development is found in U.S. Pat. No. 4,483,486 issued to Magda on Nov. 20, 1984, in which a self-contained combination wet/dry spreader is taught. The dry granulated materials are broadcast by an spinning impeller in response to manual driving of the spreader; the spreader carrying tanks of liquid material which are pumped to a spray nozzle by means of a pump means driven in response to movement of the spreader. In this particular apparatus the spray pattern is laterally isolated from the dry material pattern of distribution, thereby seriously impairing uniformity of distributing both liquid and dry products simultaneously.

BRIEF SUMMARY OF THE INVENTION

In brief the improved spreading apparatus or applicator of this invention obviates the aforenoted difficulties and shortcomings of known combination wet/dry spreaders, typified by the aforenoted patents, for example.

The improved spreader apparatus of this invention employs a hopper for holding and gravitationally dispensing granulated dry fertilizer materials to an under disposed impeller which is rotatably driven in response to manual propulsion of the spreader apparatus. The dry materials are broadcast in a generally semi-circular pattern and in a horizontal plane. Wet treatment materials are stored in a tank carried by the hopper and pumped under pressure by means of an electrically powered pump means to a plurality of spray nozzles located forwardly and beneath the dry material impeller. Thus, the wet materials are sprayed in a pattern located beneath the dry material pattern envelope, thereby protecting the wet materials from wind drift while isolating the wet materials from the dry fertilizer distributing means. Electrically powered valve means, suitably controlled by individual switch means, permit the operator to selectively control the spray pattern or patterns evolving from the multiple spray heads whereby the applicator is capable of spreading dry materials alone or in conjunction with the wet materials and vice versa. An optional hand spray wand is provided for hand spraying application to areas requiring limited and locally controlled distribution, such as along fences, between bushes, sidewalk cracks and other hard to reach areas, thus eliminating the need for supplemental portable spray equipment.

It is one of the principle objects of this invention to provide a combination wet/dry machine or apparatus for applying dry and liquid lawn treatment materials over turf areas.

Still another important object of this invention is to provide an improved combination wet-dry fertilizer/herbicide spreader employing a wheel driven rotating impeller system for broadcasting dry fertilizer materials and a self-contained, electrically operated, low volume liquid spraying system workable in conjunction with a dry spreader system.

Still another important object of this invention is to provide an improved wet/dry apparatus and method of applying dry and liquid lawn treatment materials by which liquid herbicides and like materials are applied within and beneath the spread pattern application envelope of the dry materials.

Another important object of this invention is to provide an improved wet/dry applicator for applying wet and dry lawn treatment materials either simultaneously or independently of one another.

Still another important object of this invention is to provide an improved spreader for applying lawn treatment materials embodying a manually powered wheel driven rotating impeller system for broadcasting dry fertilizer granules, and liquid storage tank means carried by the dry material spreader system embodying electrically operated pump means and valve means coupled with electrical controls for regulating the spray pattern of a plurality of liquid distributing spray nozzles.

Having described this invention, the above and further objects, features and advantages thereof will be apparent to those familiar with the art from the following description of a preferred embodiment thereof, illustrated in the accompanying drawings, and representing the best mode presently contemplated for enabling those of skill in this art to make and practice this invention and from which it will be understood that this invention lies in the construction, arrangement and combination of elements as more particularly defined in the claims appended hereto.

IN THE DRAWINGS

FIG. 1 is a front elevational view of a wet/dry fertilizer spreading apparatus according to this invention;
FIG. 2 is a side elevation thereof;
FIG. 3 is a rear elevation thereof;
FIG. 4 is a top plan thereof;
FIG. 5 is a partial cross sectional view taken substantially along vantage line 5—5 of FIG. 2 and looking in the direction of the arrows thereon;
FIG. 6 is a schematic diagram of the liquid distributing system employed in the apparatus of FIGS. 1-5;
FIG. 7 is a schematic electrical circuit diagram of the electrical controls associated with the liquid distributing systems; and
FIG. 8 is a schematic illustration of the liquid and dry material spread patterns provided by the apparatus of FIGS. 1-5.

DESCRIPTION OF THE PREFERRED EMBODIMENT

Figure 4:
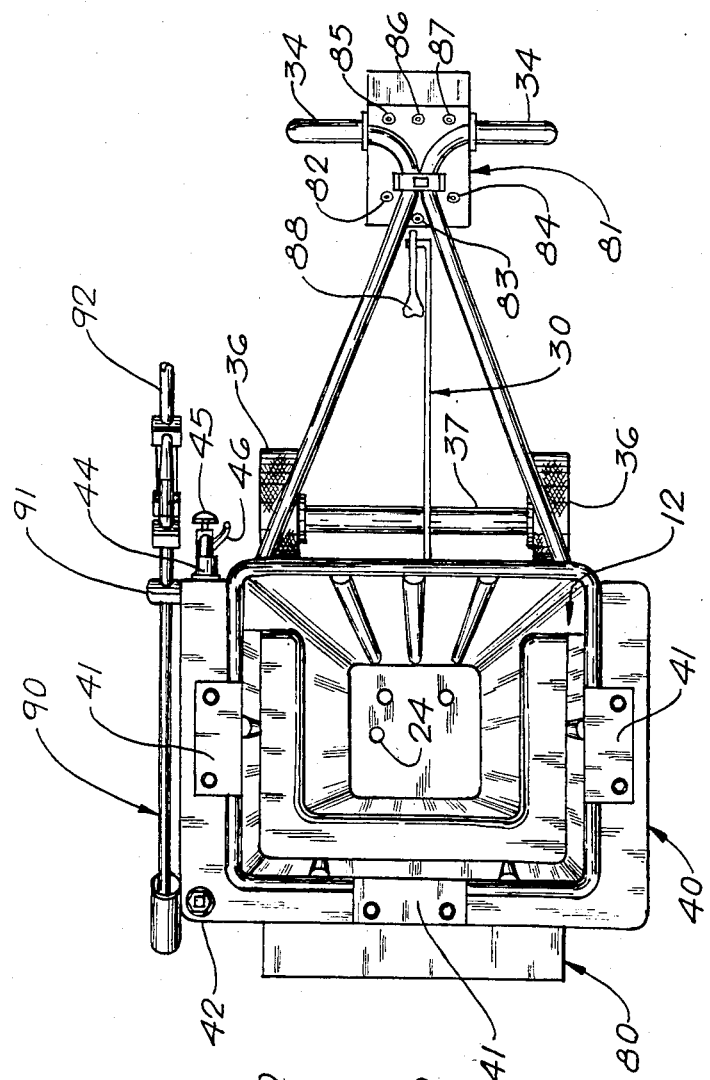

FIGS. 1-4 of the drawings disclose the features of a self-contained hand operated applicator, indicated generally by numeral 10, for distributing wet and dry lawn care products, in accordance with this invention.

It will be recognized that the applicator 10 incorporates a generally conventional cyclone type dry fertilizer spreader comprising load carrying hopper means 12 of generally rectangular plan profile supported on a tubular under frame 14 extending over and carrying a horizontal axle 16 having ground engaging drive wheels 18 fixed to its opposite ends outwardly of the frame means 14. Axle 16 drives a gear train (not shown) located in a transmission case 20 for rotatably driving a vertically extending impeller shaft 22 having an impeller means 23 mounted concentrically thereabout. Dry granulated materials falling through the bottom of hopper means 12 are centrifically broadcast in a generally circular pattern in response to rotational activity of the impeller means 23 in a known manner.

Regulation of the discharge of granular material from the hopper onto the impeller 23 is accomplished by changing the size of plural discharge openings or orifices 24 located in the bottom wall of the hopper 12. This is accomplished, in accordance with conventional practice by a shutter (not shown) moveable over openings 24 in response to operation of manually operated means 26 (see FIG. 3) adapted to be selectively locked against graduated scale means 28, all in a known manner. In addition to the opening regulating means 26 manually operated control rod means 30 serves to open and close the several discharge orifices 24.

An auxiliary handle frame 32 is fastened to the rear side of hopper supporting frame 14; terminating at its upper end in a pair of outwardly turned manually engageable handles 34,34. At the lower end of frame 32 a pair of stabilizing wheels 36,36 are mounted on axle 37, rearwardly of the main hopper supporting drive wheels 18 to stabilize the applicator against tipping and overturning.

An auxiliary shield member 38 is optionally positionable along one side of the impeller 23 to laterally restrict the discharge pattern for the dry materials. Such shield is used when fertilizing along a driveway, walk or the like.

It will be appreciated that the foregoing general description of a cyclone type spreader is illustrative of existing lawn fertilizer equipment for distributing dry ingredients which is particularly applicable to the teachings and concepts of the present invention.

In order to adapt the described dry ingredient spreader to the dispensing of liquid herbicides and the like, a generally U-shaped plastic tank and liquid reservoir 40 is attached, as by bracket means 41, to the front and side walls of the generally rectangular shaped hopper means 12 (see FIG. 4) so as to be supported from the upper rim or lip of the hopper body. Preferably the tank 40 is made of suitable plastic materials, such as high density polyethylene, and is of substantially sealed construction except for inlet and outlet fittings. More specifically the tank 40 is provided with a filling cap 42 on its upper wall for filling the tank 40 with a suitable supply of liquid herbicide or other chemical mix which due to the regulation of the spray discharge, permits utilization of higher concentrated liquid materials then is employed in the more conventional tank truck spray systems.

In addition to the filling cap 42, an inlet supply fitting 44, associated pressure regulating valve 45 and flexible supply tube 46 are mounted on the rear wall of the tank 40. Discharge fittings 47 and 48 extend from the bottom front corner margins of the tank 40 to shut off valves 49 and 50, respectively, and line filters 51 and 52 (see FIGS. 1 and 2). Flexible hoses 54 lead from the two filters 51 and 52 to pump means as will appear presently.

Laterally spaced spray nozzles 56–58 are mounted on a horizontal mounting bar 60, positioned forwardly of the wheels 18. Bar 60 is carried by a pair of vertically extending threaded adjustment rods 62,62 attached at their lower ends to a horizontal mounting bracket 64 carried parallel to axle 16, by two bracket arms 65,65 fixed to frame 14 (see FIGS. 1 and 2). Threading adjustment of the rods 62 serves to elevate or depress the spray emitting from the several nozzles 56–58 for purposes of changing the extent of the spray pattern.

Figure 3:
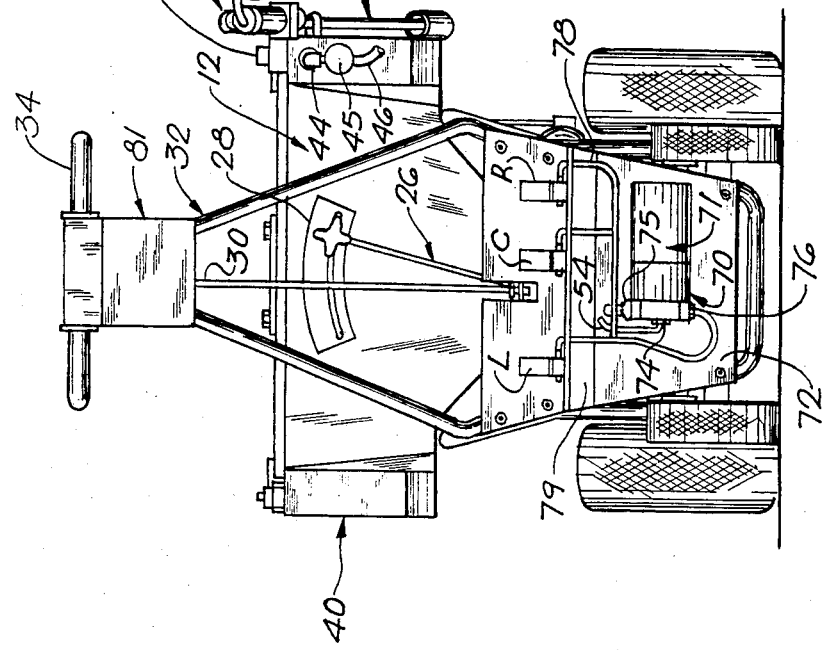

In order to pressurize the liquid contents of the reservoir 40, a diaphragm pump 70 powered by an electrical motor 71 is provided; the same being mounted on a mounting bracket 72 carried by angularly disposed legs 73,73 of the handle frame 32 (see FIG. 2). As best shown in FIG. 3 of the drawings, pump 70 has an intake 74 and a pair of discharge outlets 75 and 76. Intake 74 is connected to the filter discharge lines 54 associated with the two tank discharge outlets 47 and 48 on the forward lower corners of the tank means 40. Provision of such two tank outlets assures liquid supply to the pump when the applicator is tilted sideways, as when moving along the side of a hill or similar sloping grade.

The pump's discharge outlet 75 is connected to the hose 46 associated with the inlet fitting 44 for the tank 40. Regulation of the control valve 45 in line 46 serves to regulate the overall system pressure as produced by the discharge of the pump means 70.

Discharge outlet 76 of the pump is connected by a tubing network 78 to three solenoid valves marked L, C and R in FIG. 3 for respectively controlling the flow of fluid to nozzles 56, 57 and 58. Thus, when the solenoid operated valves are in a deenergized or closed position, the respectively associated spray nozzles are isolated from the pressurized fluid. Conversely opening any one or more of the solenoid operated valves serves to supply pressurized fluid to the respectively associated nozzle means. The above described hydraulic system is illustrated schematically in FIG. 6 of the drawings.

Turning now to the particulars of the electrical supply means for powering the motor 70 as well as the several solenoid operated valves, particular reference is made to FIGS. 1–4 and 7 of the drawings.

As shown in FIGS. 2 and 4, in particular, the front wall of the tank 40 is equipped with a rectangular shaped battery carrier 80 in which are mounted a pair of high energy compact batteries connected in parallel to supply 12 volt DC to the motor means 71 as well as to the several solenoid operated valves (see FIG. 7). The batteries preferably are of the rechargeable type and may be readily replaced in the field by the operator to avoid unwarranted delay in the lawn service operation. It is fully contemplated that in some instances an appropriate power supply may be provided over an extension cord or cable leading to a generator carried by a remote service truck, although this type of power supply is not preferred because of the need to drag the trailing cable behind the applicator during and throughout its maneuvering.

To control the several aforedescribed electrical elements, namely, the electrical motor 71 and the several solenoid operated valves associated with the spray nozzles 56–58, a control box 81 is mounted on the upper end of the handle frame 32, immediately below its extending handle portions 34 as best shown in FIGS. 1–4 of the drawings. The upper wall of the control box 81 is equipped with six manually operable switch means 82–87 which may be of a toggle or plunger type. Switch 83, it will be noted, is located in direct alignment with the manually operable handle 88 of the control rod 30 associated with the dry fertilizer spreader and preferably is a plunger type switch so that upon manipulating the handle 88 to discharge dry materials from hopper means 12 (from its FIG. 4 position to FIG. 1 position), the plunger switch 83 will be depressed to energize an associated circuit, as will appear presently.

With particular reference to the several switch means 82–87, switch 82 is a master control switch which connects battery power to the control panel or box 81 (see FIG. 7). With switch 82 closed and the dry material control handle in its "on" position to depress switch 83, the controls are conditioned for dry material application or dry and wet material application as selected.

In the event that it is desired to provide spray application only, the dry material control handle 88 is moved to a lowered or "off" position as indicated by the arrows in FIG. 2 and as shown specifically in FIG. 4, thereby opening switch 83. Under such circumstances the bypassing of open switch 83 to energize the several solenoid controlled valves and motor means 71 may take place by closing the auxiliary control switch 84.

Each of the spray nozzles and specifically operation of the solenoid valves L, C and R are controlled by the individual manually operated control switches 85, 86 and 87 respectively. Each of the switches 85–87 may be in an "on" or "off" position at the selective control of the operator. In other words, each of the switches 85–87 is independent of the others so as to effect individual selected control of the respectively associated nozzle sprays. If none of the switches 85–87 is actuated to "on" then only dry material application may take place.

In addition to the electrically controlled spray nozzles 56–58, it is contemplated, as illustrated, that the applicator apparatus 10 will also be equipped with a manually controlled wand spray 90 held in clips 91,91 at one side of the hopper 80 and connected by hose means 92 to the liquid distributing network 78 associated with the several solenoid operated valve means L, C and R. Such wand preferably is equipped with approximately 10 feet of hose or tubing and is employed for selective application of spray materials to out of the reach places, such as along fence lines, sidewalk cracks and like areas not normally adapted for spray application by any one or more of the nozzle sprays 56–58.

Having described the various elemental portions which go to make up the improved combination applicator in accordance with this invention, its use and operation will now be set forth.

Use and Operation

It will be understood from the foregoing descriptive materials that the applicator 10 is capable of spreading dry treatment materials or spraying wet treatment materials at the selection of the operator and for applying both wet and dry materials simultaneously and in desired control patterns of application. The application of the dry fertilizer is accomplished by using the traditional wheel driven rotating impeller type system, preferably of the cyclone variety, as above described. By combining the self-contained electrically operated manually controlled, low-volume liquid spraying system with the dry fertilizer spreader, the applicator 10 in accordance with this invention has the capability of spraying an exact prescribed amount of liquid herbicide or other liquid treatment material within and beneath the spread pattern of the dry materials being applied.

Simultaneous wet/dry operation is controlled from the operator's position by using a convenient manually operable switching system which permits the operator to vary the spray pattern to coincide with the changing conditions of the turf area he is servicing. Thus, for example, by controlling the spray pattern of the liquid materials ornamental plants, lawn furniture, children's play areas, patios, driveways and so forth may be avoided by controlling the appropriate electrically controlled valves installed in the pressurized line serving each of the three distributing nozzles. As noted hereinabove, the several nozzles 56, 57 and 58 are located directly below and ahead of the dry material impeller. This allows the liquid chemicals or herbicide to be sprayed under the protective envelope of the dry material being spread. The close proximity to the turf and the overlying windshielding effect created by the dry materials reduces the normal wind drift affect on the liquid sprayed materials. FIG. 8 of the drawings illustrates the relationship of the several liquid spray patterns to the dry material pattern or envelope, indicating that the spray material is applied substantially coterminous with the dry spreading envelope.

In normal operation both of the outside nozzles 56 and 58 are spraying at one time. If the lawn area becomes congested, the operator at the flip of a switch can turn "on" or "off" any or both nozzles without changing the spread pattern of the dry material. The center nozzle 57 is designed to be used in a "spray only" situation when it is necessary to do very exacting trim work around delicate ornamentals or other obstacles. This spray nozzle emits in a substantially straight downward direction (see FIG. 2) to disperse a herbicide solution or other liquid treatment materials in a narrow band no wider than the outside limits of the spreader drive wheels 18,18. This permits the operator to travel adjacent to flower beds, gardens, etc., to accomplish the desired weed control or other treatment service without fear of damaging desireable plant materials.

The provision of the optional wand system 90 provides an availability to the operator for hand spraying as necessary. As noted, a connecting flexible tube of substantially 10 feet or more permits the operator to spray weeds along fences, between bushes, sidewalks, or other hard to reach areas without having to make special trips to a supply truck for a supplemental spray unit as is the usual practice in the lawn service industry.

The battery pack is a long lasting type easily rechargeable over night and has a capacity sufficient to satisfy a normal full day's operation. Because it is compact in size, a spare battery unit conveniently may be carried on the supply truck on which the applicator 10 is moved from site to site and thus is available for replacing the battery in the event it should run down in operation.

Due to its compact design, the applicator of this invention is capable of passing through normal yard gates and can be maneuvered easily around obstacles and trees at the operator's will. Thus the desireable objectives of a compact combination wet/dry application machine avoiding the problems and application difficulties heretofore experienced in the lawn service industry are resolved by the present invention.

From the foregoing it is believed those familiar with the art will readily recognize and appreciate the novel advancement presented by the present invention and will readily appreciate that while the same has hereinabove been described in association with a preferred embodiment thereof illustrated in the accompanying drawings, the same is susceptible to wide variation, modification and substitution of equivalents without departing from the spirit and scope of the invention which is intended to be unlimited by the foregoing except as may appear in the following appended claims.

I claim:

1. A self-contained, manually propelled apparatus for applying wet and dry lawn treatment materials comprising: hopper means for containing a load of dry treatment material, frame means undersupported on ground engaging wheels for carrying said hopper means in an elevated position and including manually engageable handle means whereby to manually propel the apparatus over the terrain; rotatably driven impeller means mounted beneath said hopper means for receiving dry materials discharged therefrom, means for rotatably driving said impeller means in response to manual propulsion of the apparatus; said impeller means being operable to centrifically broadcast dry materials in a generally horizontal pattern above the level of said wheels; selectively operable means for controlling discharge of dry materials to said impeller means; sealed pressure tank means supported on and extending about the outer periphery of said hopper means for storing liquid and having liquid inlet and outlet means, electrically driven pump means carried by said frame means for pressurizing said liquid and having hydraulic circuit communication with said inlet and outlet means, plural laterally spaced spray nozzles supported on said frame means forwardly of said impeller and wheels and in hydraulic circuit communication with said pump means; said nozzle means being individually operable to spray liquid treatment materials in selected patterns forwardly in advance of the apparatus and beneath the discharge pattern of dry materials broadcast from said impeller means; electrically operated valve means for independently controlling the discharge of liquid from each of said nozzle means, and plural electrical switch means for electively controlling said valve means for individual and simultaneous operation.

2. The combination of claim 1, and battery means carried by said apparatus for powering said pump means, valve means and switch means.

3. The combination of claim 1, and solenoid means in circuit with said switch means for operatively controlling operation of said valve means.

4. The combination of claim 1, and means for adjusting elevation of said nozzle means whereby to regulate the spray pattern therefrom.

5. The combination of claim 1, and an hydraulic system interconnecting said tank means, valve means, and nozzle means in a closed pressurized circuit; said pump means operably pressurizing the hydraulic system for the discharge of pressurized fluid from said nozzle means; and means for regulating the pressure in said system.

6. The combination of claim 1, wherein said means for controlling discharge of dry material to said impeller means comprises manually operable means which when positioned to effect discharge of materials to said impeller means, operatively activates one of said electrical switch means to condition said electrically operated valve means for operation, and said switch means comprises an individual manually operated switch in circuit with each of said electrically operated valve means whereby to individually actuate each of said nozzle means.

7. The combination of claim 1, wherein said nozzle means comprises at least one spray nozzle located laterally between said wheels and operable to discharge liquid materials downwardly therebetween in a narrow generally vertical pattern.

* * * * *